Figure 1:
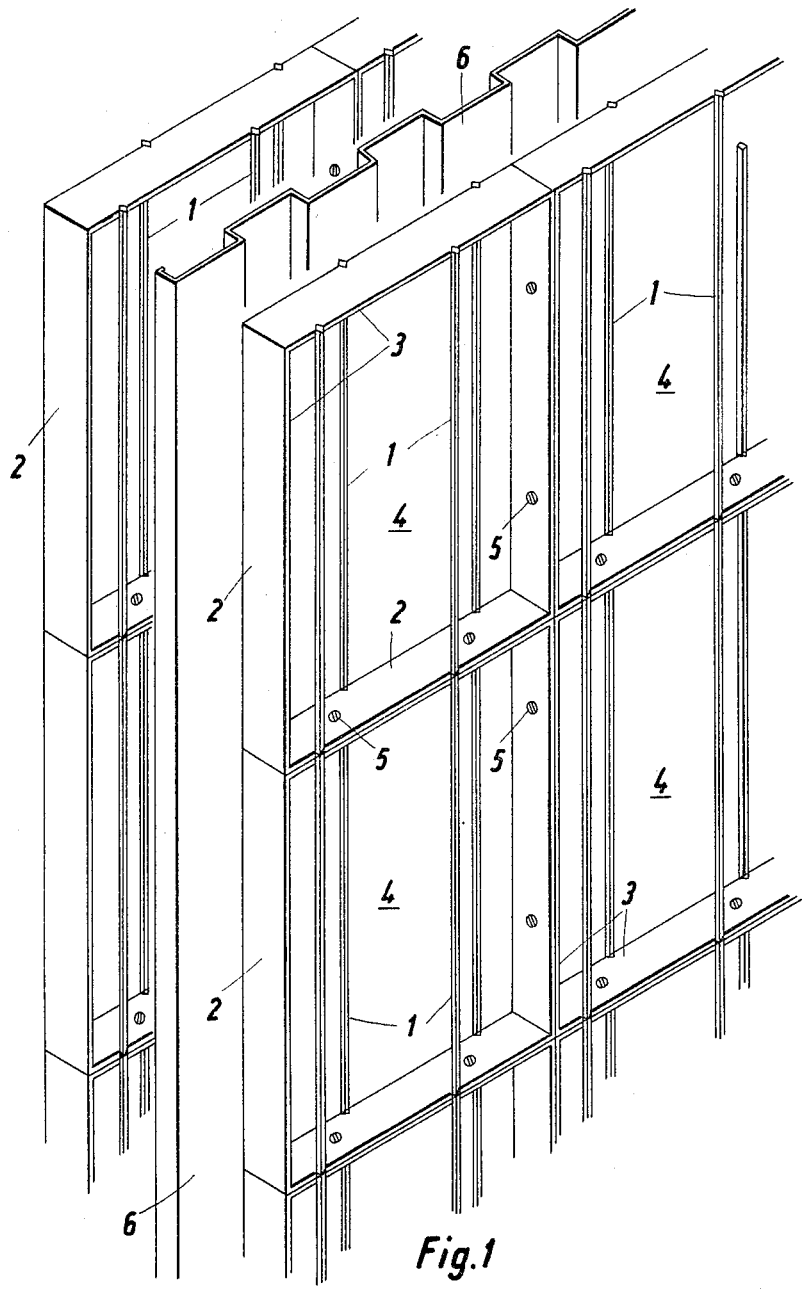

Nov. 1, 1966 W. STEUERNAGEL 3,282,029
EMITTING ELECTRODE CONSTRUCTION FOR ELECTROSTATIC SEPARATORS
Filed June 1, 1964 6 Sheets-Sheet 2

Inventor:
Walter Steuernagel
By
Bailey, Stephens & Huettig
Attorneys

Nov. 1, 1966   W. STEUERNAGEL   3,282,029
EMITTING ELECTRODE CONSTRUCTION FOR ELECTROSTATIC SEPARATORS
Filed June 1, 1964   6 Sheets-Sheet 5

Inventor:
Walter Steuernagel
By
Bailey, Stephens + Huettig
Attorneys

United States Patent Office 3,282,029
Patented Nov. 1, 1966

3,282,029
EMITTING ELECTRODE CONSTRUCTION FOR
ELECTROSTATIC SEPARATORS
Walter Steuernagel, Frankfurt am Main, Germany, assignor to Metallgesellschaft Aktiengesellschaft, Frankfurt am Main, Germany
Filed June 1, 1964, Ser. No. 371,652
Claims priority, application Germany, June 19, 1963,
M 45,018
3 Claims. (Cl. 55—141)

This invention relates to electrostatic dust separators and, in particular, to the construction of the emitting or spark electrodes for such separators or filters.

The spark or emitting electrodes of conventional electrostatic dust separators are shaped so as to form electric fields matching the dimensions of the precipitating or dust collecting electrodes. The emitting electrodes are ordinarily hung from pipe frameworks and held by means of clamps, wedges, wires, spiral springs, or screws and the like. In order to ensure that, during the operation of the dust separator, the wires will not be changed in their distance from the precipitating electrodes, that is, the emitting electrodes do not vibrate, they are tightened or placed under tension when installed. This results in the repeated breakage of the emitting electrodes because of changes in temperature and heavy vibrations in the separator, and this breakage causes short-circuits and a breakdown of surface conduction which reduces the efficiency of the separator.

Also, the installation of the emitting electrodes and the construction of the emitting electrode field is time-consuming and costly, and this is especially true for the replacement of broken parts. It has also been found that the supporting framework for the emitting electrodes bends when the separator is cleaned, which means that, because of the further warping of the bent frame due to the heat expansion caused by the hot gases, the emitting electrodes are also bent. Furthermore, the framework can be slightly warped merely because of the inherent weight of the emitting electrodes hung from the framework, and this tends to decrease the distance between the emitting electrodes and the precipitating electrodes, at least on one side of the gas channel extending between precipitating electrodes.

The object of this invention is to mount the emitting electrodes so as to avoid the above disadvantages. According to this invention, the field of the emitting electrodes is subdivided into small grate-like replaceable and individual electrode fields, with each electrode field subject to substantially smaller forces due to the weight of construction and temperature changes.

Thus this invention uses an emitting electrode construction having elements which are easily exchanged and which are not under objectionable mechanical stresses and strains. A supporting framework can be used, although in many cases it is not necessary.

In this invention, the grate-like individual elements for the emitting electrodes of an electrostatic separator are provided with emitting electrodes in the form of round wires, star wires, pointed wires, and/or hoop iron. These electrodes are pressure welded to rectangular frames composed of flat iron strips and each frame forms an individual element which is combined with similar elements to form an emitting electrode wall and with the individual frames electrically and conductively connected to each other.

When the precipitating or dust collecting plates are provided with depressions or so-called dust pockets that have very little gas flow through them, then the dust separating efficiency of the separator is impaired by the positioning of a series of emitting electrodes in the middle of the gas passageway between the precipitating electrodes. This is because the distances between each emitting electrode and its corresponding precipitating electrode are uneven. An increase in separator efficiency is obtainable by offsetting each emitting electrode from the middle of the gas passageway about one-half of the distance the wall of the precipitating electrode pocket is displaced behind the actual plane of the precipitating electrode if the electrical voltage is increased and the precipitating electrodes are uniformly spaced.

In practice, however, it is shown that difficulties are caused by the offsetting of the emitting electrodes. This is because of the clumsy and costly method of securing the emitting electrodes to a supporting framework, the bending of the framework, and because of the cleaning of the electrodes by knocking or rapping when the electrodes are no longer hung in the same vertical plane.

Consequently, another feature of this invention is in that the emitting electrodes in the individual frames are alternately offset on the frame. The usual supporting framework for the emitting electrodes can be eliminated when smaller and standard frame units composed of flat iron strips are used and stacked on one another and then connected by rivets and bolts so that they are electrically joined to each other.

Figure 2:
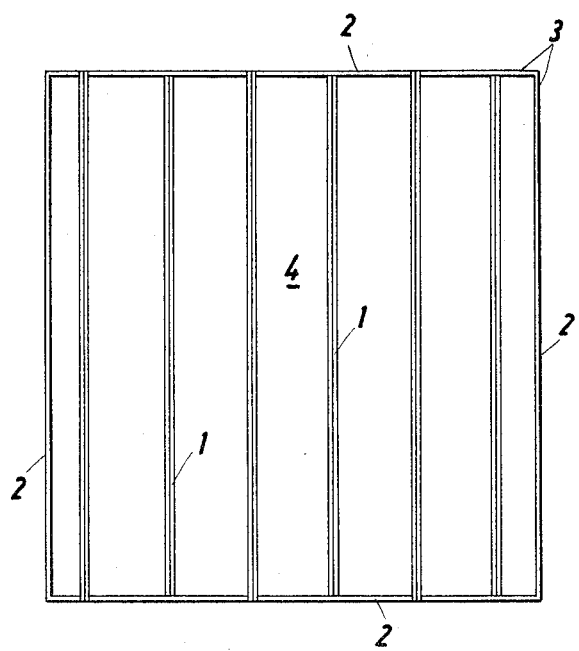
Figure 3:
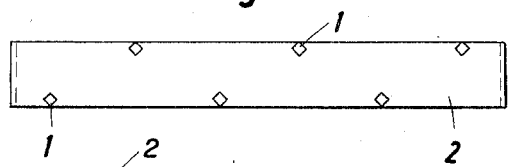
Figure 4:
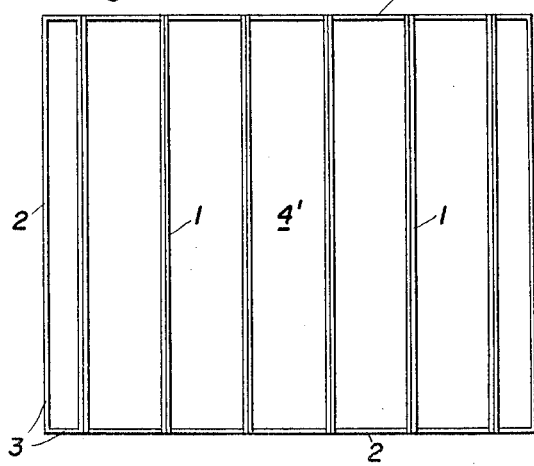
Figure 5:
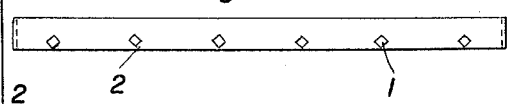
Figure 6:
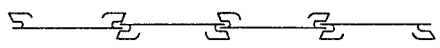
Figure 6:
Figure 6:
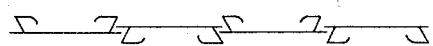
Figure 6:
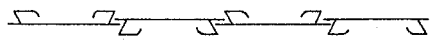
Figure 6:
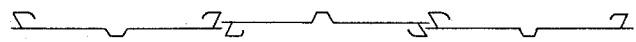
Figure 6:
Figure 6:
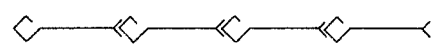
Figure 6:
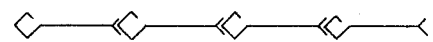
Figure 7:
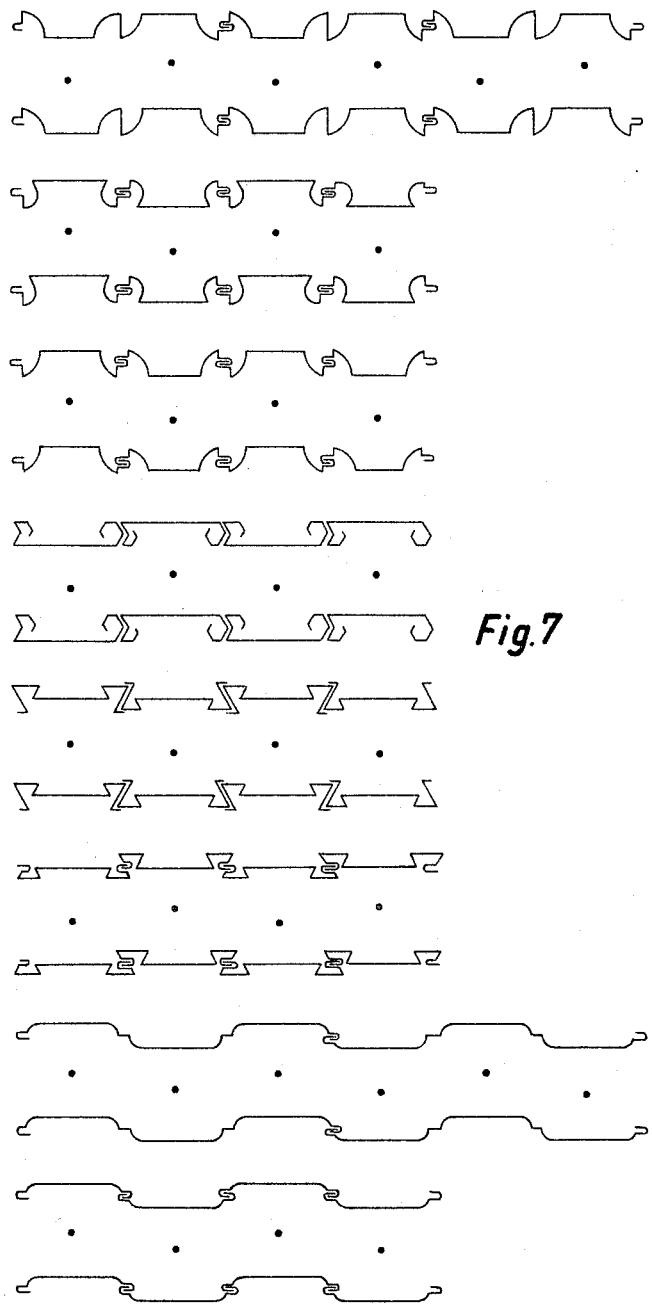
Figures 8, 9, 10:
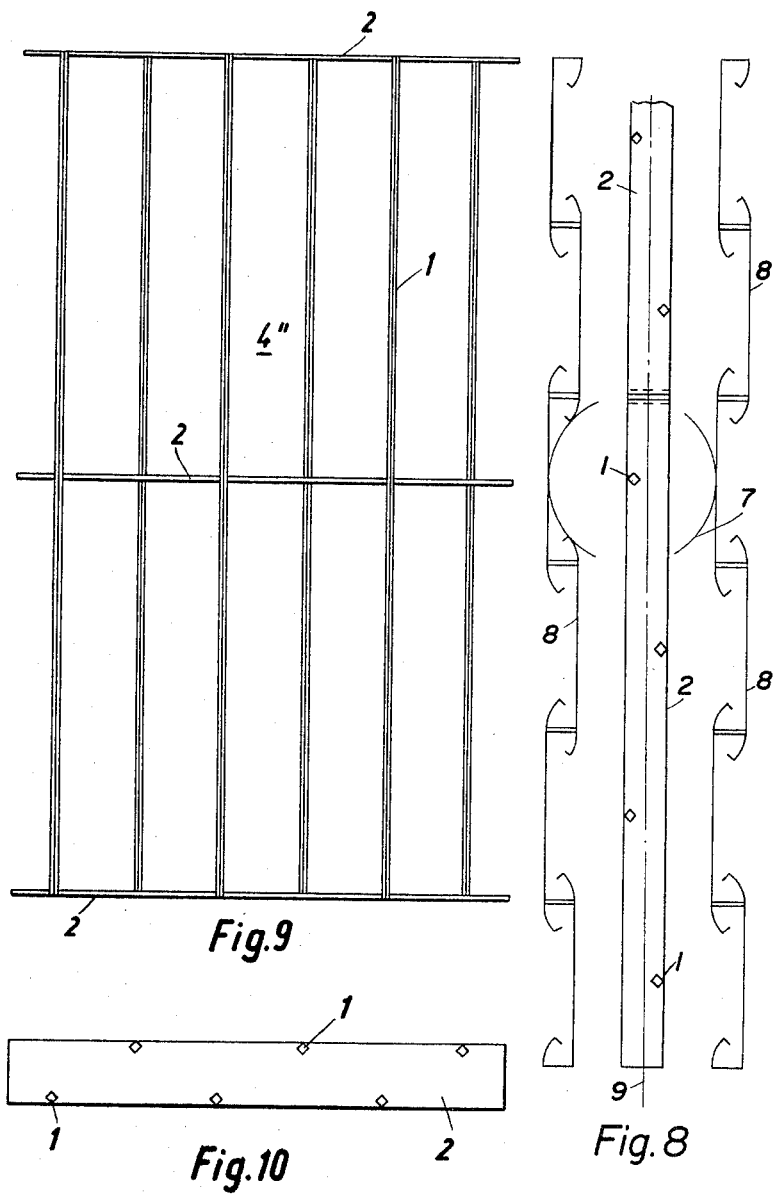
Figure 11:
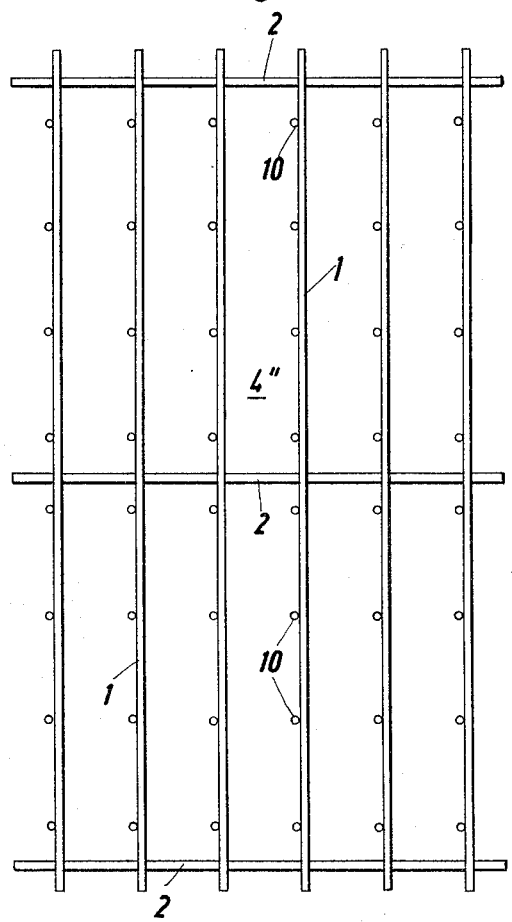
Figure 12:
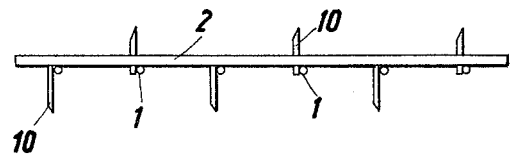

The means by which the objects of the invention are obtained are described more fully with reference to the accompanying schematic drawings in which:

FIGURE 1 is a perspective view of the emitting electrode construction of this invention;
FIGURE 2 is a front elevational view of an electrode emitting unit frame;
FIGURE 3 is a plan view of FIGURE 2;
FIGURE 4 is a view similar to FIGURE 2 of a modified form of the invention;
FIGURE 5 is a plan view of FIGURE 4;
FIGURE 6 is plan views of different gas passageways with the emitting electrodes mounted between rows of precipitating electrode plates;
FIGURE 7 is a view similar to FIGURE 6, but further showing the emitting electrodes offset with respect to the center line of the gas passageways in accordance with the dust collecting pockets in the precipitating electrodes;
FIGURE 8 is a plan view showing the use of the emitting electrode frames of this invention, together with dust pockets in the precipitating electrodes;
FIGURE 9 is a front view of a modified form of emitting electrode frame unit;
FIGURE 10 is a plan view of FIGURE 9;
FIGURE 11 is a view similar to FIGURE 9 of a modified form of the invention using spark discharge points on the emitting electrode wires; and
FIGURE 12 is a plan view of FIGURE 11.

As shown in FIGURES 1 to 3, the emitting electrode rods or wires 1 are pressure welded to flat iron strips 2 forming a frame 3 and each frame, together with the emitting wires, constituting an electrode emitting unit 4. These individual units 4 are assembled by being stacked upon one another and are electrically, conductively connected together by bolts 5. These grate-like individual units have the advantage in that an electrode field can be produced of any desired size from the emitting electrodes contained in standard units. In FIGURES 1 to 3, the emitting wires are alternately offset from the middle of the frame to accord with the dust collecting pockets in the precipitating electrode 6. In FIGURES 4 and 5, the wires 1 are arranged in a straight row in the unit 4'.

An example of the dust collecting pocket construction of the precipitating electrodes assembled to form a gas passageway in which are placed the emitting electrodes contained in the units 4, and of the general type disclosed in FIGURE 1, is further shown in FIGURE 8. The circular emitting electrode spark field 7 is shown in its relation to the precipitating electrode plates 8. It is therefore apparent that it is advantageous to alternately offset the emitting electrode wires 1 with respect to the middle or center line 9 of the gas passageway between the precipitating electrodes. These emitting electrode wires are offset at about the width of the frame 3.

In FIGURES 6 and 7, various gas passageways are schematically shown which are composed of rows of precipitating electrodes between which are the emitting electrodes. The precipitating electrodes of FIGURE 6 require an emitting electrode unit 4' as shown in FIGURES 4 and 5. The precipitating electrodes of FIGURE 7 require an emitting electrode unit as shown in FIGURES 2 and 3. For purposes of simplicity, the frames 3 have been omitted.

In the modification of FIGURE 9, the emitting electrode unit 4" is reinforced by using an additional flat iron strip 2 in the middle of the frame. This gives additional rigidity in units of extreme length. In FIGURES 11 and 12, the emitting electrode wires 1 have spark points 10 attached thereto.

Having now described the means by which the objects of the invention are obtained, I claim:

1. In an electrostatic dust separator having spaced rows of vertically disposed longitudinally extending plate-like precipitating electrodes forming a longitudinally extending gas passageway and a plurality of vertically disposed wire-like emitting electrodes positioned in said gas passageway substantially midway between said precipitating electrodes, the improvement comprising support means located in said passageway for supporting said emitting electrodes comprising a plurality of vertically arranged open-ended rectangular frames composed of flat iron strips, each said frame having connected flat top, bottom and side wall portions and having open ends facing said precipitating electrodes, said emitting electrodes being fixedly and electrically conductively secured to the peripheral edges of said flat top and bottom wall portions, said frames being stacked with said flat wall portions in surface contact with each other, and means securing and electrically connecting said frames to each other.

2. In a separator as in claim 1, the improvement in which a plurality of emitting electrodes are alternately offset on opposite peripheral edges of each frame.

3. In a separator as in claim 2, the improvement in which the emitting electrodes are pressure welded to the flat iron strips forming said frames.

References Cited by the Examiner
UNITED STATES PATENTS

| | | | |
|---|---|---|---|
| 2,283,964 | 5/1942 | Wyckoff | 55—2 |
| 2,380,992 | 8/1945 | Pegg et al. | 55—143 X |
| 2,639,781 | 5/1953 | Savitz | 55—141 X |
| 2,822,057 | 2/1958 | Richardson | 55—143 |
| 2,852,093 | 9/1958 | Streuber | 55—150 X |
| 2,922,883 | 1/1960 | Giaimo. | |

ROBERT F. BURNETT, *Primary Examiner.*